United States Patent [19]

Hagedoorn et al.

[11] 4,180,843

[45] Dec. 25, 1979

[54] DEVICE FOR PROTECTING ELECTRIC SYSTEMS, PARTICULARLY TELECOMMUNICATION SYSTEMS, AGAINST OVERVOLTAGE PULSES

[75] Inventors: Rijnder Hagedoorn, Leidschendam; Ernest J. E. Koenderink, The Hague, both of Netherlands

[73] Assignee: De Staat der Nederlanden, te dezen vertegenwoordigd door de directeur-generaal der Posterijen, Telegrafie en Telefonie, The Hague, Netherlands

[21] Appl. No.: 863,410

[22] Filed: Dec. 22, 1977

[30] Foreign Application Priority Data

Dec. 22, 1976 [NL] Netherlands ........................ 7614273

[51] Int. Cl.[2] ............................................... H02H 3/22

[52] U.S. Cl. ..................................... 361/119; 361/56; 361/120; 361/129

[58] Field of Search .................. 361/118, 119, 55, 56, 361/117, 120, 129

[56] References Cited

U.S. PATENT DOCUMENTS

| | | | |
|---|---|---|---|
| 3,777,219 | 12/1973 | Winters | 361/118 |
| 3,824,431 | 7/1974 | Schlicke | 361/126 |
| 3,992,652 | 11/1976 | Blaisdell et al. | 361/118 |

FOREIGN PATENT DOCUMENTS

| | | |
|---|---|---|
| 2092319 | 1/1972 | France . |
| 2156877 | 6/1973 | France . |
| 2293812 | 7/1976 | France . |
| 7601330 | 2/1976 | Netherlands . |

*Primary Examiner*—Harry E. Moose, Jr.
*Attorney, Agent, or Firm*—Frishauf, Holtz, Goodman & Woodward

[57] ABSTRACT

Device for protecting electric systems, particularly telecommunication systems, against overvoltage, comprising the combination of a tube of conducting material and permitting a passage through the wall with an overvoltage protective circuit placed in the tube and comprising at least two diverting components, in such a way that a voltage peak, even with a steepness of 5kV/nsec, can be diverted step by step.

7 Claims, 5 Drawing Figures

DEVICE FOR PROTECTING ELECTRIC SYSTEMS, PARTICULARLY TELECOMMUNICATION SYSTEMS, AGAINST OVERVOLTAGE PULSES

The present invention relates to a device for protecting electric systems, particularly telecommunication systems, against overvoltage pulses.

A known device of this type has been designed in order to cope with overvoltage pulses caused by atmospheric discharges, and comprises a housing made of insulating material containing electrodes for the purpose of diverting the pulses. In this device there is no question of a shielding against other magnetic or electric fields, and, moreover, the known device is too slow to be able to divert overvoltage pulses caused by nuclear explosions, which pulses can have a steepness of 5 kV/nsec, as against a steepness of 10 kV/μsec for overvoltage pulses caused by atmospheric discharges.

There is now also a known device which is asserted to be capable of diverting overvoltage pulses caused by nuclear explosions (see published Netherlands application No. 7,601,330). This device, however, leaves unprotected the holes provided in the wall for the passage of conductors, which is especially risky in case the number of these conductors is large. Moreover, it must be inferred that the overvoltage diverters disclosed comprise only a single component that cannot adequately divert the overload pulses having the steepness above mentioned.

THE PRESENT INVENTION

It is an object of the present invention to provide protection for electric systems such as telecommunication systems against overvoltages of the kind that can be induced by nuclear explosions.

Briefly, a tube permitting the passage of conductors through a wall is provided with an overload protective circuit placed in the tube and comprising at least two diverting components, in such a way that a voltage peak can be diverted step by step.

Such a circuit is known in itself, but what is not known, however, is a proper housing, without which the circuit cannot function or cannot function satisfactorily in the critical circumstances here under consideration. Thus, waveguides in the wall of a Faraday cage are known in themselves for ventilation purposes.

The invention is based on the concept of providing a housing for the protector components in the configuration of a waveguide coaxial with the conductors of the protected electric circuit. For low frequency signals of small amplitude serving for the desired transmission of information, the tube has the function of a coaxial conductor; for undesired fields it functions as a waveguide below the cut-off frequency and for undesired overvoltage pulses on the conductors the circuit serves as an attenuation network. It appears that in the case of a tube at only one end of which radiating fields can have a disturbing influence, the radiation at the other end can be neglected, if the dimensions of the tube are e.g. 10 cm×2 cm×2 cm, even if the disturbing pulses have a steepness of ≦5 kV/nsec.

The invention is explained below with the aid of the drawings representing an embodiment.

Figure 1:
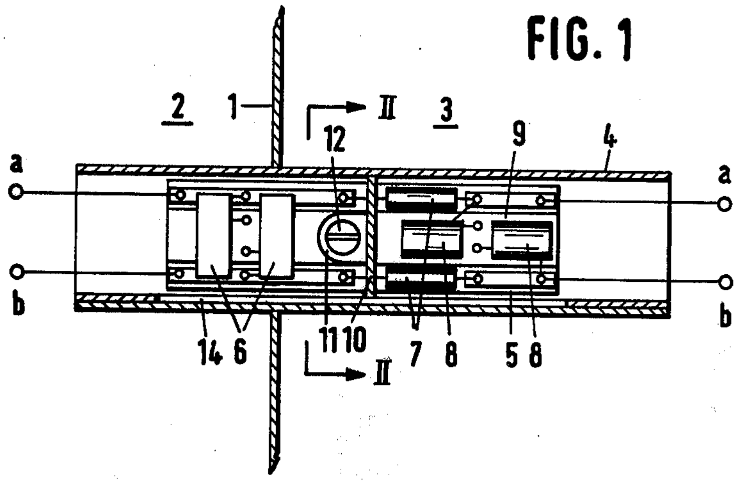
FIG. 1 shows a longitudinal section of a device.
Figure 2:
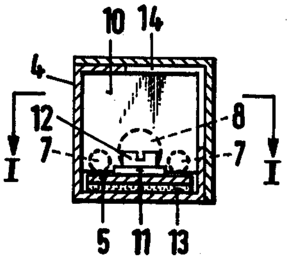
FIG. 2 shows a cross-section of the device according to FIG. 1.
Figure 3:
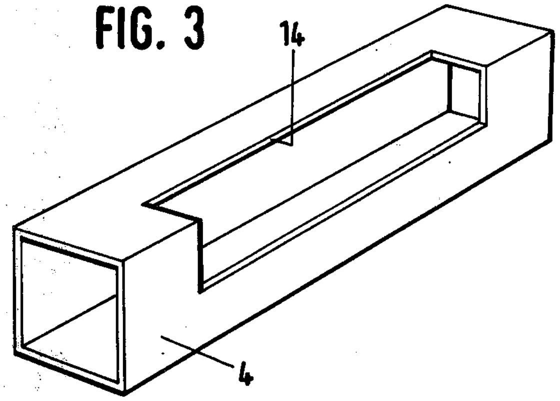
FIG. 3 shows a perspective view of the device.

In FIG. 1, 1 designates the wall of a Farady cage. The space outside the cage is designated by 2, whereas 3 designates the space inside the cage. The space 3 contains e.g. a telephone exchange to which one or more cables, each containing a number of pairs a-b, are connected. The conductors a, b can be separately led through a tube 4 in the wall 1, but each tube can also contain more than one conductor as shown by FIG. 1. A printed circuit board 5 between the entrance and the exit of the tube is provided with a circuit comprising for each conductor a first diverting component 6, an induction coil, 7 and a second diverting component 8. Grounding is provided via a middle strip 9 on the printed circuit board 5. In consequence of its response time requirement the component 6 cannot sufficiently divert a nuclear explosion voltage peak of e.g. 10 kV. The remaining voltage peak of e.g. 1000 V is diverted by the second diverting component 8. The steepness (di/dt) of the current supplied to this second component is kept small by means of the induction coil 7, thus taking into account the greater slowness of the second component. A transverse partition 10 with a lip 11, as well as the printed circuit board and the insulating plate 13 are fixed to a wall of the tube, so that not only the affixation, but also the grounding of the middle strip 9 is ensured. The mounting is effected through an opening 14 in the tube as shown by FIG. 3.

Figure 4:
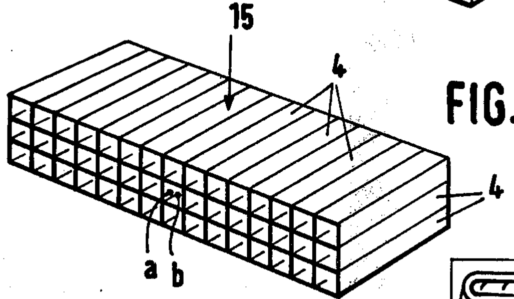
FIG. 4 shows a block of devices.

FIG. 4 shows a number of devices combined to a block 15, which can be so composed that the openings 14 are not on the outside of the block. The block, however, can also be shielded by means of plates.

Figure 5:
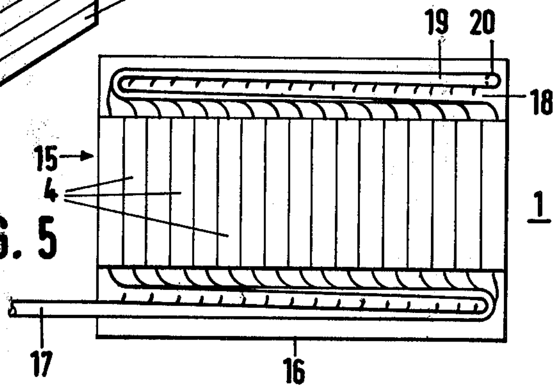
FIG. 5 shows a cable channel containing a block of devices.

FIG. 5 shows the way in which a block 15 is placed in a cable channel 16 of which the cover has been removed. This cable channel can be mounted e.g. on the outside wall of a Faraday cage. The cable channel 16 with the block 15 forms, as it were, part of the wall 1 (FIG. 1). A cable 17 is divided into pairs which are led to the various tubes 4 of the block 15. On the other side of the block the pairs are joined in a shielded space 18 to form a cable 19, which is led through a hole 20 in the wall 1 to the telephone exchange in the shielded space.

The invention is not restricted to the embodiment and to the possibility of utilization as described above. Some variations are listed below:

- the wall 1 (FIG. 1) may be near one of the ends of the tube(s);
- The cross section of the tubes may have a different shape:
  - hole-filling: triangular or hexagonal, or
  - not hole-filling: e.g. round;
- the tubes can be inserted or screwed in separately;
- the circuit may differ from the circuit described above; and
- the circuit can be inserted in the end of the tube, which makes the opening 14 superfluous. This is especially of importance in case spare tubes have been provided and the number of conductors that have to pass through the wall needs to be increased.

The metal tubes may, of course, like waveguides, be made of copper, and likewise the partition 10. On the other hand, cheaper and stronger metal such as steel, preferably plated with copper on the inside, or otherwise provided with a copper lining, also can provide highly suitable tubes for use in overvoltage protection assemblies in accordance with the invention.

The components 6, 7 and 8 of the protection circuit are conventional components in conventional array circuit arrangement for protecting telecommunication circuits. Such a circuit is described, for instance, in U.S. Pat. No. 3,777,219.

We claim:

1. An assembly for protecting against overvoltage at least one electric circuit, particularly of a telecommunication system, at a place where the circuit passes through a wall of a building defining a boundary between an exposed part of the circuit and another part of the circuit that is less exposed and more sensitive to overvoltage, comprising in combination:

a tube of conducting material surrounding a connection between said exposed circuit part and said other circuit part and providing a passage for said connection through said wall;

an overvoltage protection circuit interposed in said connection and mounted on a printed circuit board located in said tube comprising at least two diverting components connected in such a way that an overvoltage peak can be diverted step by step thereby, and a transverse partition of conducting material provided between the respective locations of said two diverting components, said printed circuit board and said partition being firmly mounted in said tube.

2. An overvoltage circuit protection assembly as defined in claim 1, in which said diverting components include a fast-acting component, a slower-acting component that backs up said fast-acting component and a current-surge-reducing component interposed in said connection at a location between the respective connections to said fast-acting and said slower-acting diverting components, said fast-acting component being located on the side of said partition corresponding to said exposed part of said circuit and said interposed component and slower-acting component being located on the other side of said partition.

3. An overvoltage circuit protection assembly as defined in claim 1 in which said tube is at least 10 cm long and its interior cross-sectional area is not substantially greater than 4 $cm^2$.

4. A collection of assemblies each of which are defined as in claim 1 for protecting a plurality of circuits passing respectively through a corresponding plurality of tubes, in which the tubes of the respective assemblies are combined in the form of a block of tubes, and in which at at least one end of the tubes of the block a shielded space is provided adjoining said end of the tubes, and in which in said shielded space an end of a cable is located together with the distribution of the circuit conductors of the cable among the respective tubes and protecting assemblies.

5. A collection of assemblies each of which are defined as in claim 1 for protecting a plurality of circuits passing respectively through a corresponding plurality of tubes, in which the tubes of the respective assemblies are combined in the form of a block of tubes, and in which at at least one end of the tubes of the block a shielded space is provided adjoining said end of the tubes, and in which in said shileded space an end of a cable is located together with the distribution of the circuit conductors of the cable among the respective tubes and protecting assemblies.

6. A collection of assemblies as defined in claim 4, in which the block of tubes is located in a cable channel and forms a protective screen effective in the longitudinal direction of the cable channel.

7. A collection of assemblies as defined in claim 5, in which the block of tubes is located in a cable channel and forms a protective screen effective in the longitudinal direction of the cable channel.

* * * * *